(12) United States Patent
Zaim et al.

(10) Patent No.: US 9,184,682 B2
(45) Date of Patent: Nov. 10, 2015

(54) CONTROL OF A PERMANENT-MAGNET ELECTRIC MACHINE

(71) Applicants: HISPANO-SUIZA, Colombes (FR); UNIVERSITE DE LORRAINE, Nancy (FR)

(72) Inventors: Sami Zaim, Paris (FR); Farid Meibody-Tabar, Villers les Nancy (FR); Babak Nahid-Mobarakeh, Villers les Nancy (FR); Regis Bernard Albert Meuret, La Rochette (FR)

(73) Assignees: LABINAL POWER SYSTEMS, Blagnac (FR); UNIVERSITE DE LORRAINE, Nancy (FR)

( * ) Notice: Subject to any disclaimer, the term of this patent is extended or adjusted under 35 U.S.C. 154(b) by 0 days.

(21) Appl. No.: 14/374,605

(22) PCT Filed: Jan. 21, 2013

(86) PCT No.: PCT/FR2013/050123
§ 371 (c)(1),
(2) Date: Jul. 25, 2014

(87) PCT Pub. No.: WO2013/114021
PCT Pub. Date: Aug. 8, 2013

(65) Prior Publication Data
US 2014/0333244 A1 Nov. 13, 2014

(30) Foreign Application Priority Data
Jan. 31, 2012 (FR) .................................... 12 50888

(51) Int. Cl.
*H02P 6/16* (2006.01)
*H02P 6/18* (2006.01)
*H02P 21/14* (2006.01)

(52) U.S. Cl.
CPC ................ *H02P 6/165* (2013.01); *H02P 6/183* (2013.01); *H02P 6/185* (2013.01); *H02P 21/146* (2013.01); *H02P 2203/03* (2013.01); *H02P 2203/11* (2013.01)

(58) Field of Classification Search
CPC ............ H02P 2101/15; H02P 21/0032; H02P 21/141; H02P 9/007; H02P 21/146
See application file for complete search history.

(56) References Cited

U.S. PATENT DOCUMENTS 5,493,195 A * 2/1996 Heglund et al. ............... 318/701
6,051,946 A   4/2000 Yamada et al.
(Continued)

FOREIGN PATENT DOCUMENTS

EP   2 120 324   11/2009

OTHER PUBLICATIONS

International Search Report Issued Mar. 12, 2013 in PCT/FR13/050123 filed Jan. 21, 2013.

*Primary Examiner* — Bentsu Ro
*Assistant Examiner* — Zoheb Imtiaz
(74) *Attorney, Agent, or Firm* — Oblon, McClelland, Maier & Neustadt, L.L.P.

(57) ABSTRACT

A method of controlling a permanent magnet synchronous machine including a stator and a rotor. The method includes determining an estimated position of the rotor, and determining a second in-phase voltage setpoint that, in alternation, is equal either to a first in-phase voltage setpoint or else to the first in-phase voltage setpoint plus a predetermined periodic signal. The determining an estimated position of the rotor includes determining a coupling term, determining a speed of rotation of the rotor as a function of the coupling term, and determining the estimated position of the rotor by integrating the speed of rotation of the rotor.

9 Claims, 1 Drawing Sheet

(56) References Cited

U.S. PATENT DOCUMENTS

2002/0140395 A1* 10/2002 Tazawa et al. ................ 318/727
2003/0052643 A1* 3/2003 Sweo ............................ 318/801
2009/0039810 A1* 2/2009 Gotz et al. ............... 318/400.32
2009/0315495 A1 12/2009 Yasui
2010/0320763 A1* 12/2010 Li et al. .......................... 290/44

* cited by examiner

CONTROL OF A PERMANENT-MAGNET ELECTRIC MACHINE

BACKGROUND OF THE INVENTION

The present invention relates to controlling a permanent magnet synchronous machine.

In order to control a permanent magnet synchronous machine, it is known that it is necessary at all times to know the position of its rotor. Conventionally, position sensors are used to measure the position and to calculate the speed of the machine. The main drawback of using such sensors (and the processor cards that accompany them) is a reduction in the reliability of the system, where reliability is paramount in the field of aviation. Other drawbacks of that solution are the increases in the weight, in the volume, and in the total cost of the system.

A large amount of research work has therefore been performed in order to do without such a position sensor, and thus to estimate mechanical variables solely on the basis of measuring stator currents.

Several methods have already been proposed and validated for controlling a synchronous machine at medium and high speeds without using a position sensor. Those methods are based on estimating the no-load electromagnetic force (EMF) vector on the basis of imposed voltages, of measuring currents, and of equations describing the machine. Since EMF is directly proportional to speed, speed can also be estimated, as can position, which is then obtained merely by integrating the speed. Nevertheless, since the EMF is zero when the machine is stopped and since it is buried in measurement noise at low speeds, it is no longer observable in such operating ranges. Methods based on estimating EMF are therefore not suitable for applications in which position control is required.

In order to estimate position at low speeds and when stopped, the only remaining solution is to use variations in the values of stator inductances as a function of the position of the rotor. Several methods have already been proposed that make use of the variations in inductances:

In a first type of method, the principle is to switch off control even ten or twenty periods of pulse width modulation (PWM) and to inject a high frequency signal (at a frequency higher than the passband of the current regulators). The ratio of the injected voltage over the measured variation of current makes it possible to estimate inductance, and since inductance depends on position, it is also possible to estimate position. An example is described in the document by J. Kiel, A. Bünte, S. Beineke, "Sensorless torque control of permanent magnet synchronous machines over the whole operation range", EPEPEMC, TP-053, Dubrovnik & Cavat, September 2002.

In a second type of method, the error in the position estimate is itself estimated in an initial stage. This error is regulated towards zero with the help of a corrector. The output from the corrector provides an estimate of speed, and by integration it is possible to obtain the estimated position of the rotor. In order to calculate the error of the estimate, a measure of the current immediately after injecting the high frequency (HF) signal is compared with the current that would theoretically be obtained if no HF signal had been injected.

The methods of the first above-mentioned type have the following drawbacks:
The estimated position is calculated directly, so it therefore suffers from discontinuities each time it is calculated. Since the voltage references are calculated on the basis of the position of the rotor, the references will also be subjected to discontinuities, which gives rise to jolts of torque that can be harmful.

The need to stop control in order to make an estimate. Every ten or twenty periods of the PWM (depending on desired accuracy), one such period is devoted solely to injecting a high frequency signal for estimation purposes.

Under such circumstances, it is necessary to oversample the stator current when making the estimate.

The methods of the second above-mentioned type suffer from the following drawbacks:

In those methods, a measured current is compared with a current that ought to be obtained theoretically. In order to be able to do that, it is necessary to have an accurate model of the motor if the methods are to converge properly. They therefore become dependent on uncertainties concerning the parameters of the machine, and also on variations in those parameters.

Furthermore, those methods apply only to smooth rotor machines.

There therefore exists a need to improve the control of a synchronous machine at low and zero speeds.

OBJECT AND SUMMARY OF THE INVENTION

The invention seeks to satisfy this need by proposing a control method for controlling a permanent magnet synchronous machine having a stator and a rotor, said method comprising:
a step of determining an estimated position of the rotor;
a step of determining an in-phase current and a quadrature current as a function of stator currents and of the estimated position of the rotor; and
a step of determining a first in-phase voltage setpoint and a quadrature voltage setpoint as a function of the in-phase current, of the quadrature current, of an in-phase current setpoint, and of a quadrature current setpoint;
the method being characterized in that it comprises:
a step of determining a second in-phase voltage setpoint that is equal in alternation either to the first in-phase voltage setpoint or else to the first in-phase voltage setpoint plus a predetermined periodic signal;
a step of determining stator voltage setpoints as a function of the second in-phase voltage setpoint, of the quadrature voltage setpoint, and of the estimated position of the rotor; and
a step of controlling said synchronous machine as a function of the stator voltage setpoint;
wherein the step of determining an estimated position of the rotor comprises:
a step of determining a coupling term as a function of a difference between the quadrature current when the second in-phase voltage setpoint is equal to the first in-phase voltage setpoint and the quadrature current when the second in-phase voltage setpoint is equal to the first in-phase voltage setpoint plus the predetermined periodic signal;
a step of determining a speed of rotation of the rotor as a function of said coupling term; and
a step of determining the estimated position of the rotor by integrating the speed of rotation of the rotor.

Correspondingly, the invention proposes a control unit for controlling a permanent magnet synchronous machine having a stator and a rotor, said control unit comprising:

means for determining an estimated position of the rotor;

a module for determining an in-phase current and a quadrature current as a function of stator currents and of the estimated position of the rotor; and a module for determining a first in-phase voltage setpoint and a quadrature voltage setpoint as a function of the in-phase current, of the quadrature current, of an in-phase current setpoint, and of a quadrature current setpoint;

the control unit being characterized in that it comprises:

a module for determining a second in-phase voltage setpoint that is equal in alternation either to the first in-phase voltage setpoint or else to the first in-phase voltage setpoint plus a predetermined periodic signal;

a module for determining stator voltage setpoints as a function of the second in-phase voltage setpoint, of the quadrature voltage setpoint, and of the estimated position of the rotor; and control means for controlling said synchronous machine as a function of the stator voltage setpoint;

wherein the means for determining an estimated position of the rotor comprise:

a module for determining a coupling term as a function of a difference between the quadrature current when the second in-phase voltage setpoint is equal to the first in-phase voltage setpoint and the quadrature current when the second in-phase voltage setpoint is equal to the first in-phase voltage setpoint plus the predetermined periodic signal;

a module for determining a speed of rotation of the rotor as a function of said coupling term; and a module for determining the estimated position of the rotor by integrating the speed of rotation of the rotor.

The step of determining a speed of rotation of the rotor as a function of said coupling term may include using a corrector for canceling the coupling term.

Preferably, the predetermined periodic signal is a pulse signal.

In an embodiment, the step of controlling said synchronous machine as a function of the stator voltage setpoint comprises delivering said stator voltage setpoint to a pulse width modulated inverter presenting a predetermined period, said second in-phase voltage setpoint being equal to the first in-phase voltage setpoint plus the predetermined periodic signal for one to three periods of the pulse width modulation, once every 15 to 25 periods.

The rotor may be a salient pole rotor. The rotor may also be a smooth rotor, said method including a step of saturating stator teeth facing poles of the rotor.

The invention also provide a control system comprising a control unit in accordance with the invention, an inverter, and a synchronous machine.

The invention also provides a computer program including instructions for executing steps of a control method in accordance with the invention when said program is executed by a computer.

The program may use any programming language, and be in the form of source code, object code, or of code intermediate between source code and object code, such as in a partially compiled form, or in any other desirable form.

The invention also provides a computer readable data medium or recording medium that includes instructions of a computer program as mentioned above.

The above-mentioned data medium may be any kind of entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the recording medium may correspond to a transmissible medium such as an electrical signal or an optical signal suitable for being conveyed via an electrical or optical cable, or by radio, or by other means. The program of the invention may in particular be downloaded from an Internet type network.

Alternatively, the recording medium may correspond to an integrated circuit in which the program is incorporated, the circuit being adapted to execute or to be used in the execution of the method in question.

BRIEF DESCRIPTION OF THE DRAWING

Other characteristics and advantages of the present invention appear from the following description made with reference to the accompanying drawing which show embodiments having no limiting character. In the figures.

DETAILED DESCRIPTION OF EMBODIMENTS

Figure 1:
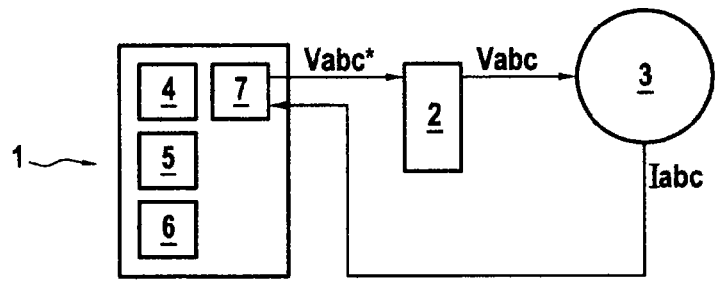
FIG. 1 is a diagram of a control system in an embodiment of the invention.

FIG. 1 shows a control system for a permanent magnet synchronous machine in an embodiment of the invention. The FIG. 1 system comprises a control unit 1, a pulse width modulation inverter 2, and a permanent magnet synchronous machine 3.

The synchronous machine 3 comprises a rotor carrying permanent magnets and a stator having three-phase windings. The three-phase voltages of the stator are written Vabc and the three-phase currents of the stator are written Iabc. The synchronous machine 3 may be characterized by various magnitudes, in particular by its stator dynamic inductances. The synchronous machine 3 is a machine in which the dynamic inductances of the stator depend on the position of the rotor. It may thus be a synchronous machine with a salient pole rotor, but it may also be a synchronous machine with a smooth rotor in which the stator teeth facing the rotor magnets are either slightly saturated or else caused to be slightly saturated by imposing a sufficiently high positive value on the stator current along the estimated in-phase axis. The structures of such machines are known to the person skilled in the art and they are therefore not described in detail herein.

The inverter 2 delivers the three-phase voltages Vabc for the synchronous machine 3 from a power supply voltage (not shown) by means of pulse width modulation as a function of voltage setpoints Vabc* provided by the control unit 1. The operation of such an inverter 2 is known to the person skilled in the art and is therefore not described in detail herein.

The control unit 1 determines the three-phase voltage setpoints Vabc* for delivery to the inverter 2 in order to control the synchronous machine 3. For this purpose, the control unit 1 estimates the position of the rotor of the synchronous machine 3 on the basis of the variation in the dynamic inductances of the stator as a function of the position of the rotor, as explained below.

In the embodiment shown, the control unit 1 presents the hardware architecture of a computer and comprises a processor 4, non-volatile memory 5, volatile memory 6, and an input/output interface 7. The processor 4 serves to execute computer programs stored in the non-volatile memory 5 while using the volatile memory 6. The operation of the control unit 1 as described below results from executing such a program. The input/output interface 7 serves in particular to obtain measurements of the currents Iabc of the synchronous machine 3 and to deliver the voltage setpoints Vabc* to the inverter 2.

In a variant, the control unit 1 is a digital control unit of the digital signal processor (DSP), or microcontroller, or field programmable gate array (FPGA) type of card.

Figure 2:
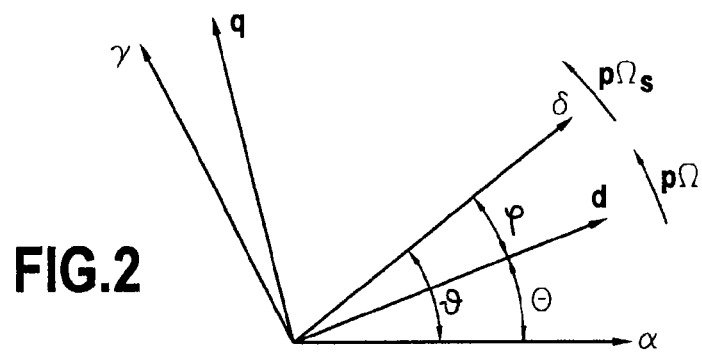
FIG. 2 shows reference frames associated with the real and estimated positions of the rotor of the synchronous machine in the system of FIG. 1.

With reference to FIG. 2, there follows an explanation of the principle used by the control unit 1 for estimating the position of the rotor of the synchronous machine 3.

It is known that the voltages Vabc can be expressed by an in-phase voltage $v_d$ and by a quadrature voltage $v_q$ in a reference frame d,q associated with the rotor of the synchronous machine 3. Likewise, the currents Iabc can be expressed by an in-phase current $i_d$ and a quadrature current $i_q$ in the reference frame d,q. FIG. 2 shows the reference frame d,q and an angle θ that represents the position of the rotor relative to a reference axis α.

Consideration is given to a motor having salient poles for which the variation in the self-inductance of a phase as a function of the position θ of the rotor, and ignoring higher harmonics, can be written in the following form:

$$L_s(\theta) = \overline{L}_s + \tilde{L}_s \cdot \cos(2\theta + \theta_0) \tag{2}$$

This function is constituted by a constant portion (the average value) and by a variable portion of period equal to 180° electrical. $\theta_0$ depends on the phase under consideration.

In the d,q reference frame, the equations for the synchronous machine 3 are as follows (and valid even under saturated conditions):

$$\frac{d}{dt}\begin{bmatrix} \psi_d \\ \psi_q \end{bmatrix} = \begin{bmatrix} v_d \\ v_q \end{bmatrix} - R_s \cdot \begin{bmatrix} i_d \\ i_q \end{bmatrix} - p\Omega \cdot P(\frac{\pi}{2}) \cdot \begin{bmatrix} \psi_d \\ \psi_q \end{bmatrix} \tag{3}$$

where P(θ) is a rotation matrix defined as follows:

$$P(\theta) = \begin{bmatrix} \cos\theta & -\sin\theta \\ \sin\theta & \cos\theta \end{bmatrix} \tag{4}$$

$(i_d, i_q)$, $(v_d, v_q)$, and $(\Psi_d, \Psi_q)$ are the in-phase and quadrature components of the currents, voltages, and total stator fluxes, Ω is the real mechanical speed of rotation of the synchronous machine 3, $R_s$ is the resistance of the windings, and p is the number of pole pairs.

Considering only the first harmonic of the electromotive forces on the stator, and ignoring the effect of cross saturation between the equivalent coils d and q ($m_{dq}=0$), giving:

$$\frac{d}{dt}\begin{bmatrix} \psi_d \\ \psi_q \end{bmatrix} = \begin{bmatrix} l_d & 0 \\ 0 & l_q \end{bmatrix} \cdot \frac{d}{dt}\begin{bmatrix} i_d \\ i_q \end{bmatrix} \tag{5}$$

where $I_d$ and $I_q$ are respectively the in-phase dynamic inductance and the quadrature dynamic inductance.

Since this description is limited to low speeds and when stopped, it assumed that the terms that are proportional to the speed Ω are negligible. Equation (3) can be simplified to become:

$$l_d \frac{di_d}{dt} = v_d - R_s i_d \tag{6}$$

$$l_q \frac{di_q}{dt} = v_q - R_s i_q \tag{7}$$

It may be observed that so far, the equations are completely decoupled. Injecting a voltage along the d axis will not give rise to any current response along the q axis.

In the absence of a position sensor in the synchronous machine 3, the control unit 1 does not have access to the position θ of the rotor and thus determines an estimated position $\hat{\theta}$. FIG. 2 also shows the reference frame δ,γ associated with the estimated position $\hat{\theta}$ of the rotor. The estimation error between the two reference frames is represented by the angle φ ($\phi = \hat{\theta} - \theta$). Both reference frames rotate relative to the stator at the electrical speed pΩ for the real reference frame (Ω is the mechanical speed of the rotor), and $p\Omega_s$ of the estimated reference frame ($\Omega_s$ is the estimated mechanical speed of the rotor).

By applying a rotation φ with the help of the matrix P(φ), equation (3) in the δ,γ reference frame becomes:

$$[L] \cdot \frac{d}{dt}\begin{bmatrix} i_\delta \\ i_\gamma \end{bmatrix} = \begin{bmatrix} v_\delta \\ v_\gamma \end{bmatrix} - R_s \cdot \begin{bmatrix} i_\delta \\ i_\gamma \end{bmatrix} - \tag{8}$$

$$p\Omega_s \cdot [L] \cdot P(\frac{\pi}{2}) \cdot \begin{bmatrix} i_\delta \\ i_\gamma \end{bmatrix} + p\Omega \cdot \left\{ P(\frac{\pi}{2}) \cdot \begin{bmatrix} \psi_\delta \\ \psi_\gamma \end{bmatrix} - [L] \cdot P(\frac{\pi}{2}) \cdot \begin{bmatrix} i_\delta \\ i_\gamma \end{bmatrix} \right\}$$

with:

$$[L] = \begin{bmatrix} l_\delta & m_{\delta\gamma} \\ m_{\delta\gamma} & l_\gamma \end{bmatrix} \tag{9}$$

$$= P(-\varphi) \cdot \begin{bmatrix} l_d & 0 \\ 0 & l_q \end{bmatrix} \cdot P(\varphi)$$

where:

$$\begin{cases} l_\delta = \frac{l_d + l_q}{2} + \frac{l_d - l_q}{2} \cdot \cos 2\varphi \\ l_\gamma = \frac{l_d + l_q}{2} - \frac{l_d - l_q}{2} \cdot \cos 2\varphi \\ m_{\delta\gamma} = -\frac{l_d - l_q}{2} \cdot \sin 2\varphi \end{cases} \tag{10}$$

Once more, since low speed conditions are assumed, it is possible to simplify these equations by ignoring terms proportional to Ω:

$$[L] \cdot \frac{d}{dt}\begin{bmatrix} i_\delta \\ i_\gamma \end{bmatrix} = \begin{bmatrix} v_\delta \\ v_\gamma \end{bmatrix} - R_s \cdot \begin{bmatrix} i_\delta \\ i_\gamma \end{bmatrix} - p\Omega_s \cdot [L] \cdot P(\frac{\pi}{2}) \cdot \begin{bmatrix} i_\delta \\ i_\gamma \end{bmatrix} \tag{11}$$

After simplification, these equations can be put into the following form:

$$l_d l_q \frac{d i_\delta}{dt} = -R_s(l_q - (l_q - l_d)\sin^2\varphi) \cdot i_\delta + (l_q - (l_q - l_d)\sin^2\varphi) \cdot v_\delta + \qquad (12)$$

$$\left( p l_d l_q \Omega_s + \frac{R_s}{2}(l_q - l_d)\sin2\varphi \right) \cdot i_\gamma - \frac{1}{2}(l_q - l_d)\sin2\varphi \cdot v_\gamma$$

$$l_d l_q \frac{d i_\gamma}{dt} = -R_s(l_d + (l_q - l_d)\sin^2\varphi) \cdot i_\gamma + (l_d + (l_q - l_d)\sin^2\varphi) \cdot v_\gamma - \qquad (13)$$

$$\left( p l_d l_q \Omega_s - \frac{R_s}{2}(l_q - l_d)\sin2\varphi \right) \cdot i_\delta - \frac{1}{2}(l_q - l_d)\sin2\varphi \cdot v_\delta$$

It can already be observed that the equations for the synchronous machine 3 in the estimated reference frame δ,γ are once more coupled. This coupling depends both on the salience of the machine (more precisely on the dynamic magnetic salience, i.e. the difference between the in-phase and quadrature dynamic inductances, the ($I_q$–$I_d$) term), and on the estimation error ϕ.

In other words, with salient poles and an error concerning the estimated position, a variation in the component δ of the voltage will cause a coupling term written $\Delta i_\gamma$ to appear on the component γ of the stator current. This term disappears if the error becomes zero.

Figure 3:
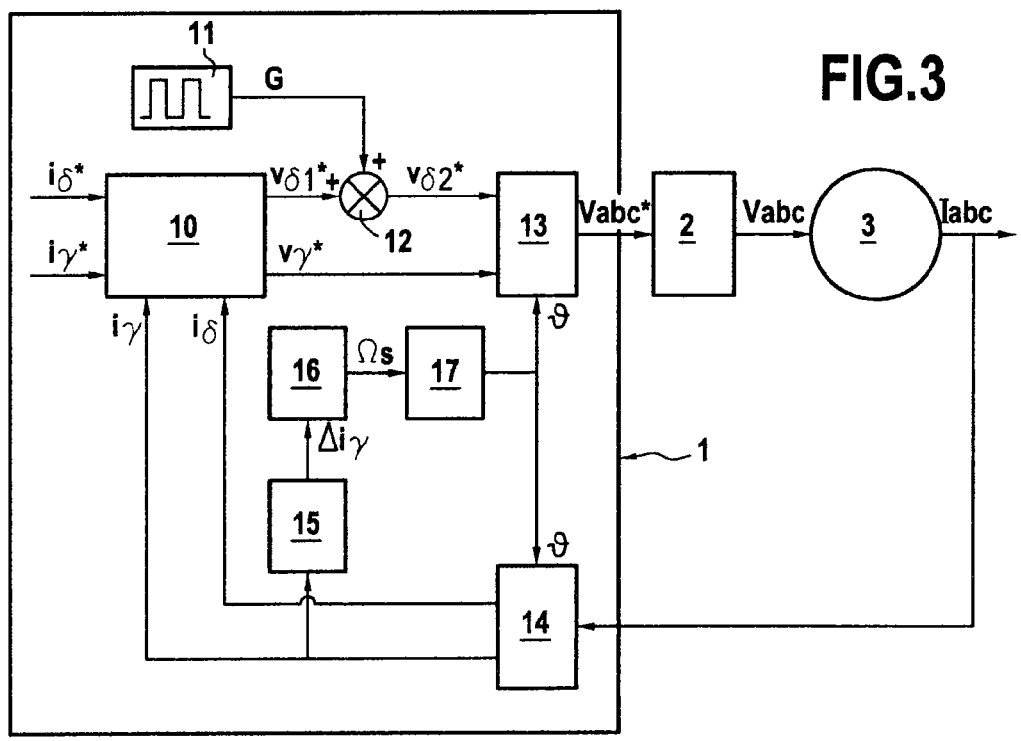
FIG. 3 is a block diagram of the FIG. 1 control system, in which the operation of the control unit is represented by functional modules.

FIG. 3 shows this principle in use in the control unit 1. In FIG. 3, the operation of the control unit 1 is represented in the form of functional modules that may correspond to the processor 4 of FIG. 1 executing a computer program.

The control unit 1 comprises a current regulator 10, a periodic signal generator 11, an adder module 12, a converter module 13, a converter module 14, a determination module 15, a speed estimator 16, and an integrator 17.

The control unit 1 works in the estimated reference frame δ,γ and manipulates the following magnitudes in particular:
- an in-phase current setpoint $i_\delta^*$ and a quadrature current setpoint $i_\gamma^*$;
- an in-phase voltage setpoint $v_{\delta_1}^*$, an in-phase voltage setpoint $v_{\delta_2}^*$, and a quadrature voltage setpoint $v_\gamma^*$;
- a high frequency periodic signal G;
- an estimated rotor speed $\Omega_s$; and
- an estimated rotor position $\vartheta$.

The current regulator 10 determines the in-phase voltage setpoint $v_{\delta_1}^*$ and the quadrature setpoint $v_\gamma^*$ as a function of the in-phase current $i_\delta$, of the quadrature current $i_\gamma$, of the in-phase current setpoint $i_\delta^*$, and of the quadrature current setpoint $i_\gamma^*$. The person skilled in the art knows how to implement such a current regulator and it is therefore not described in detail.

The periodic signal generator 11 delivers the high frequency periodic signal G. The term "high frequency" is used to mean a frequency lower than the frequency of pulse width modulation in the inverter 2 but higher than the cutoff frequency of the current regulators. In this example, the periodic signal G is a voltage pulse signal. The amplitude of its pulses is selected to be large enough for a significant coupling term to be observed in equation (13). Nevertheless, this amplitude must not be too great, since there would be a risk of disturbing the control and of increasing losses in the synchronous machine 3. The person skilled in the art knows how to determine appropriate dimensions on the basis of these indications.

The adder module 12 determines the in-phase voltage setpoint $v_{\delta_2}^*$ as a function of the in-phase voltage setpoint $v_{\delta_1}^*$ and of the periodic signal G. More precisely, the in-phase voltage setpoint $v_{\delta_2}^*$ is equal in alternation either to the in-phase voltage setpoint $$v_{\delta_1}^* (v_{\delta_2}^* = v_{\delta_1}^*)$$

or else to the in-phase voltage setpoint $v_{\delta_1}^*$ plus a periodic signal $$G(v_{\delta_2}^* = v_{\delta_1}^* + G)$$

For example, $v_{\delta_2}^*$ is normally equal to $v_{\delta_1}^*$, and once every 20 periods of the pulse width modulation of the inverter 2, $v_{\delta_2}^*$ is equal to $v_{\delta_1}^* + G$ for three modulation periods of the pulse width modulation of the inverter 2.

The converter module 13 converts the voltage setpoint from the estimated reference frame δ,γ into setpoints in the stator reference frame abc. In other words, the converter module 13 determines the stator voltage setpoints Vabc* for the inverter 2 as a function of the rotor voltage setpoint $v_{\delta_2}^*$, of the quadrature voltage setpoint $v_\gamma^*$, and of the estimated position $\vartheta$ of the rotor. The person skilled in the art knows how to make such a converter module and it is therefore not described in detail.

The converter module 14 converts the stator currents Iabc measured in the synchronous machine 3 into currents in the estimated reference frame δ,γ. In other words, the converted module 14 determines the rotor current $i_\delta$ and the quadrature current $i_\gamma$ as a function of the stator current Iabc and of the estimated positions $\vartheta$ of the rotor. The person skilled in the art knows how to make such a module and it is therefore not described in detail.

The determination module 17 determines a coupling term $\Delta i_\gamma$ that appears in the component γ when the periodic signal G is injected onto the component δ of the voltage. As explained above, the coupling term $\Delta i_\gamma$ appears with a salient pole rotor and in the event of error in the estimated position of the rotor. More precisely, the determination module 17 determines the coupling term $\Delta i_\gamma$ by calculating the difference between the quadrature current $i_\gamma$ when $v_{\delta_2}^* = v_{\delta_1}^*$ immediately before the pulse and the quadrature current $i_\gamma$ when $v_{\delta_2}^* = v_{\delta_1}^* + G$. It is then considered that during the pulse, $v_{\delta_1}^*$ varies only slowly.

The speed estimator 16 determines the estimated speed $\Omega_s$ of the rotor as a function of the coupling term $\Delta i_\gamma$. More precisely, it is known that the coupling term $\Delta i_\gamma$ disappears if the error becomes zero. The speed estimator 16 thus regulates the coupling $\Delta i_\gamma$ to zero with the help of a corrector. The output from the corrector delivers an estimate of the speed. Depending on the sign of the coupling, it is possible to determine whether the estimated reference frame is leading or lagging relative to the real reference frame. The corrector then increases the estimated speed or on the contrary slows it down, in order to cause the two reference frames to coincide. By way of example, the corrector used is a corrector of proportional integral (PI) type, which is particularly advantageous from the point of view of calculation time. Nevertheless, it is also possible to use other types of corrector. The PI corrector has the following form:

$$\Omega_S = \Omega_0 \left( \Delta i_\gamma + \frac{1}{\tau} \int \Delta i_\gamma \cdot dt \right) \qquad (14)$$

where $\Omega_0$ and τ are the parameters of the estimator for determining the convergence of the estimation and its dynamic behavior.

The integrator 17 determines the estimated position $\vartheta$ of the rotor by integrating the estimated speed $\Omega_s$:

$$\vartheta(t) = p \int_0^t \Omega_s dt + \vartheta(0) \quad (15)$$

In the equations (12) and (13), the trigonometric terms that are functions of the position error φ have a period of π (180° electrical). Consequently, this error may converge either on 0 or else on π depending on the initial position error. If the initial error is too great (|φ|<π/2), then the method is likely to converge on an error of π and control without a sensor may fail. Likewise, for a smooth rotor machine, if the initial error is too great, it is more difficult to make the machine slightly saturated in order to obtain a sufficient difference between $I_d$ and $I_q$. It is the presence of the term $(I_d-I_q)$ in equations (12) and (13) that ensures that the estimator converges. If the initial error is not sufficiently small, the amp-turns imposed by the stator currents run the risk of not having an in-phase component that is sufficient to saturate the machine. In particular, in the event of the initial error being greater than π/2, there is even a risk of desaturating the machine and of not being able to cause magnetic salience. In order to overcome these problems and determine the initial estimated position ϑ (0), it is possible to use the initialization method described in the document by D. Tanaka, R. Moriyama, I. Miki, "Initial rotor position estimation of interior permanent magnet synchronous motor using optimal voltage vector", Electrical Engineering in Japan, Vol. 156, No. 4, July 2006.

The estimated position ϑ delivered by the integrator 17 is used in particular by the converter modules 13 and 14, as described above.

The estimated position ϑ as determined by the control unit 1 presents several advantages:

Voltage pulses are injected on the axis δ and not on the axis γ. When the error becomes small, the axis δ coincides with the axis d, and as a result, the torque produced by the current resulting from the pulses becomes negligible and does not disturb the control of the synchronous machine 3. Furthermore, under such circumstances, the component d of the stator current caused by these pulses contributes to saturating the magnetic circuit and thus to increasing the salience and facilitating convergence.

Position is calculated by integrating an estimated speed and not directly. There is therefore no discontinuity on the estimation and on the current references.

The estimation method is simple and not burdensome, and is therefore associated with short calculation time.

Great robustness is obtained, since knowledge of the parameters of the synchronous machine 3 and of their variations is not required.

The invention is particularly suitable for avionics applications of the type involving flight controls, braking systems, extending landing gear, or any system making use of electric actuators having permanent magnet synchronous motors, wherever it is essential to be able to control position and thus deliver torque, even when stopped.

In the embodiment described above, the periodic signal G is a pulse signal. In an alternative embodiment, the periodic signal G is a high frequency sinusoidal signal. The current response to the injected sinusoidal voltages then gives an estimate of the inductances $I_δ$ and $I_γ$ and also on the mutual inductance $m_{δγ}$ (see equation (10)). Since this is the image of the estimation error φ, it may be corrected by the estimator module 16 to have a value of zero. This technique is more difficult to implement than that based on a periodic signal G made up of pulses. Unlike a pulse, it is not obvious how to use an inverter 2 (with a switching frequency that is determined by the pulse width modulation) to inject a signal at a frequency that needs to be much greater than the electrical frequency of the control signals in order to avoid disturbing regulation. Furthermore, in order to process the resulting current responses, it is necessary to use a bandpass filter centered on the frequency of the injected signal.

The invention claimed is:

1. A control method for controlling a permanent magnet synchronous machine including a stator and a rotor, the method comprising:
    determining an estimated position of the rotor;
    determining an in-phase current and a quadrature current as a function of stator currents and of the estimated position of the rotor;
    determining a first in-phase voltage setpoint and a quadrature voltage setpoint as a function of the in-phase current, of the quadrature current, of an in-phase current setpoint, and of a quadrature current setpoint;
    determining a second in-phase voltage setpoint that is equal in alternation either to the first in-phase voltage setpoint or to the first in-phase voltage setpoint plus a predetermined periodic signal;
    determining stator voltage setpoints as a function of the second in-phase voltage setpoint, of the quadrature voltage setpoint, and of the estimated position of the rotor; and
    controlling the synchronous machine as a function of the stator voltage setpoint;
    wherein the determining an estimated position of the rotor comprises:
        determining a coupling term as a function of a difference between the quadrature current when the second in-phase voltage setpoint is equal to the first in-phase voltage setpoint and the quadrature current when the second in-phase voltage setpoint is equal to the first in-phase voltage setpoint plus the predetermined periodic signal;
        determining a speed of rotation of the rotor as a function of the coupling term; and
        determining the estimated position of the rotor by integrating the speed of rotation of the rotor.

2. A control method according to claim 1, wherein the determining a speed of rotation of the rotor as a function of the coupling term includes using a corrector for canceling the coupling term.

3. A control method according to claim 1, wherein the predetermined periodic signal is a pulse signal.

4. A control method according to claim 1, wherein the controlling the synchronous machine as a function of the stator voltage setpoint comprises delivering the stator voltage setpoint to a pulse width modulated inverter presenting a predetermined period, the second in-phase voltage setpoint being equal to the first in-phase voltage setpoint plus the predetermined periodic signal for one to three periods of the pulse width modulation, once every 15 to 25 periods.

5. A control method according to claim 1, wherein the rotor is a salient pole rotor.

6. A control method according to claim 1, wherein the rotor is a smooth rotor, the method further comprising saturating stator teeth facing poles of the rotor.

7. A non-transitory computer readable medium including a computer program including instructions for performing a control method according to claim 1 when the program is executed by a computer.

8. A control unit for controlling a permanent magnet synchronous machine having a stator and a rotor, the control unit comprising:

- means for determining an estimated position of the rotor;
- a module for determining an in-phase current and a quadrature current as a function of stator currents and of the estimated position of the rotor;
- a module for determining a first in-phase voltage setpoint and a quadrature voltage setpoint as a function of the in-phase current, of the quadrature current, of an in-phase current setpoint, and of a quadrature current setpoint;
- a module for determining a second in-phase voltage setpoint that is equal in alternation either to the first in-phase voltage setpoint or to the first in-phase voltage setpoint plus a predetermined periodic signal;
- a module for determining stator voltage setpoints as a function of the second in-phase voltage setpoint, of the quadrature voltage setpoint, and of the estimated position of the rotor; and
- control means for controlling the synchronous machine as a function of the stator voltage setpoint;

wherein the means for determining an estimated position of the rotor comprises:

- a module for determining a coupling term as a function of a difference between the quadrature current when the second in-phase voltage setpoint is equal to the first in-phase voltage setpoint and the quadrature current when the second in-phase voltage setpoint is equal to the first in-phase voltage setpoint plus the predetermined periodic signal;
- a module for determining a speed of rotation of the rotor as a function of the coupling term; and
- a module for determining the estimated position of the rotor by integrating the speed of rotation of the rotor.

9. A control system comprising a control unit according to claim 8, an inverter, and a synchronous machine.

* * * * *